Patented Sept. 5, 1950

2,520,947

UNITED STATES PATENT OFFICE 2,520,947

RECOVERY OF HYDROGEN HALIDES

Maryan P. Matuszak, Bartlesville, Okla., assignor to Phillips Petroleum Company, a corporation of Delaware No Drawing. Application April 8, 1946, Serial No. 660,401

12 Claims. (Cl. 183—115)

1

This invention relates to the recovery of hydrogen halides, namely, hydrogen fluoride, chloride, bromide and iodide as from waste gases or from mixtures with organic compounds, especially close-boiling organic compounds or organic compounds forming azeotropes or pseudo-azeotropes with the hydrogen halides, and particularly normally gaseous hydrocarbons, especially the normally gaseous paraffins, and halogenated hydrocarbons.

The process of this invention is an improvement of the selective-absorption process of recovering hydrogen halides that is described in such patents as Engs et al. 2,282,712 and Hachmuth 2,355,857. The process of this invention is also an improvement over the invention disclosed and claimed in the copending application of F. E. Frey, Serial No. 490,506, now abandoned, which involves the recovery of anhydrous hydrogen fluoride from low-boiling aliphatic hydrocarbons by extraction of the gaseous mixture with a liquid high-boiling ether typified by diisoamyl ether and diphenyl ether. The main principle of the process to which the present invention relates is one of selectively absorbing one or more hydrogen halides by a liquid anhydrous oxycompound and subsequently stripping the hydrogen halide from the oxycompound. The present improvement resides primarily in the selection of an extraordinarily efficient oxycompound.

I have unexpectedly discovered that an exceptionally advantageous oxycompound is one that is acyclic or open-chain, preferably straight-chain, and that has at least one solely oxygen-bounded series of at least two contiguous methylene groups, with at least one of the two oxygens bounding the series being hydroxylic. So far as I am aware, such an oxycompound has not been proposed heretofore for use as a selective solvent for the recovery of hydrogen halides. Most advantageously the oxycompound is alkyl-free, inasmuch as the presence of an alkyl group increases markedly an undesirable capacity for absorbing organic compounds, particularly hydrocarbons and halogenated hydrocarbons; when an alkyl group is present, it preferably should be lighter than propyl, inasmuch as this undesirable capacity increases with the size of the alkyl group.

In one advantageous class of suitable oxycompounds for the practice of my invention are glycols having only terminal hydroxyls. The most advantageous of these is ethylene glycol,

HOCH2CH2OH possibly because it has relatively the smallest

2 proportion of carbon and hydrogen and consequently relatively the smallest tendency or capacity for absorbing organic compounds. Other suitable glycols, such as trimethylene glycol (1,3-propanediol), HOCH2CH2CH2OH, and tetramethylene glycol (1,4-butanediol),

HOCH2CH2CH2CH2OH, increase progressively in this undesirable tendency with increase in the number of methylene groups in the series bound exclusively by oxygen.

In another class of suitable oxycompounds are hydroxy ethers and polyethers derivable from glycols, as by substituting for one hydroxylic hydrogen an "alkanol" group, an "ether" group, or even an alkyl group. Ordinarily the most advantageous of this type of oxycompounds is diethylene glycol, HOCH2CH2OCH2CH2OH. Other examples, such as triethylene glycol,

HOCH2CH2OCH2CH2OCH2CH2OH and tetraethylene glycol,

HOCH2CH2OCH2CH2OCH2CH2OCH2CH2OH are especially advantageous, however, when a solvent of relatively higher boiling point is desired. Still other examples, such as diethylene glycol monoethyl ether, CH3CH2OCH2CH2OCH2CH2OH, and ethylene glycol monoethyl ether,

CH3CH2OCH2CH2OH have a somewhat relatively higher capacity for absorbing organic compounds than the glycol derivatives mentioned in the last two sentences; because this capacity increases with increase in the weight proportion of alkyl, the alkyl preferably should not be heavier than ethyl. The two last-mentioned examples are also known as "Carbitol" and "Cellosolve," respectively. Of this class of oxycompounds, the polyethylene glycols, which are alkyl-free, are generally preferred.

In addition to the afore-described types of oxycompounds, a type sometimes useful is one derivable from a glycol of the above-described type by substitution of a hydrogen on at least one of the methylene groups by one of the three groups already indicated, preferably an alkanol group. As examples may be mentioned glycerine,

HOCH2CH(OH)CH2OH 1,2-propanediol, HOCH2CH(OH)CH3; 1,2-butanediol, HOCH2CH(OH)CH2CH3; 1,3-butanediol, HOCH2CH2CH(OH)CH3; and 2,3-butanediol, CH3CH(OH)CH(OH)CH3. All of the compounds just enumerated except 1,3-butanediol may be considered to be derived from ethylene glycol, while 1,3-butanediol may be regarded as derived from trimethylene glycol. However, such compounds are not as useful as the above-described glycols and hydroxy ethers, inasmuch as they either have the undesirable capacity for dissolving and absorbing organic compounds in relatively large measure or have an undesirable tendency, as in the case of glycerine, to undergo dehydration and possibly other undesirable reactions in the presence of anhydrous hydrogen halides, particularly hydrogen fluoride. Consequently, although such oxycompounds, which do not possess at least one completely oxygen-bounded series of at least two contiguous methylene groups, can be used at times, they are ordinarily inferior to the two earlier-described types.

The present invention involves a process for the separation of a hydrogen halide from a gaseous mixture containing same together with other material such as an organic compound, particularly an organic compound difficult or impossible to separate from the hydrogen halide by ordinary means such as fractional distillation, condensation, etc., which process comprises extracting the gaseous mixture with a liquid acylic organic oxycompound selected from the group consisting of glycols, compounds derivable from the glycols by substituting for one hydroxylic hydrogen an alkanol group, an ether group or an alkyl group, and compounds derivable from the glycols by substituting for a hydrogen on at least one of the methylene groups an alkanol group, an ether group, or an alkyl group, and thereby effecting selective dissolution of the hydrogen halide in said oxycompound while allowing the material originally admixed with the hydrogen halide to pass through relatively undissolved.

I prefer that the glycols mentioned in the preceding paragraph contain not more than four carbon atoms in the chain. I prefer that the alkanol, ether and alkyl groups referred to contain not more than two carbon atoms in the chain. Generally speaking, the acylic organic oxycompounds employed as absorption liquids for the recovery of hydrogen halides are selected from the group consisting of the simple glycols, especially those ranging from ethylene glycol to tetramethylene glycol, the polyethylene glycols, especially those ranging from diethylene glycol to tetraethylene glycol, the monomethyl and monoethyl ethers of the foregoing glycols and polyethylene glycols, and the derivatives of the aforesaid glycols wherein a hydrogen atom on at least one methylene group has been replaced by a methanol or an ethanol group or by a methyl or an ethyl group.

For most applications ethylene glycol is most preferred, and diethylene glycol is next so. These two specific oxycompounds exemplify the two types that are now considered by me to be relatively most advantageous. In several respects they are far more efficient selective solvents for the hydrogen halides than the oxycompounds previously proposed, such as alcohols, carboxylic acids, esters, ethers, and di-ethers.

An important characteristic that indicates the superiority of the oxycompounds utilized in accordance with this invention is that they absorb hydrocarbons and halogenated hydrocarbons less readily than do alcohols, ethers, diethers, etc., of substantially the same boiling range. This fact, which apparently has not been previously recognized, seems to be related in some incompletely understood manner to the exceptionally high boiling points of the selected oxycompounds. For example, ethylene glycol has a boiling point of 387° F., whereas dioxane (a cyclic di-ether heretofore generally considered the best oxycompound for absorbing hydrogen halides) has a boiling point of only 215° F., and even so relatively heavy an oxycompound as diisoamyl ether has a boiling point of only 343° F. The relationship among these boiling points is in strong contrast to the relationship among the molecular weights of these compounds; ethylene glycol has the low molecular weight of 62.07, whereas dioxane and diisoamyl ether have the relatively high molecular weights of 88.10 and 158.28, respectively. It can be concluded that an aliphatic ether, for example, of the boiling point of ethylene glycol has a still higher molecular weight; in consequence, it contains a relatively large proportion of carbon and hydrogen, thereby possibly accounting for its relatively large capacity for absorbing hydrocarbons and the like.

The advantageous difference of the selected glycols and hydroxy ethers of this invention in this respect is especially important in the recovery of hydrogen fluoride, which presents a special difficulty in that it has an exceptionally high boiling point and forms azeotropic mixtures with such hydrocarbons as propane, the butanes, and the pentanes. Possibly the largest economical loss in such processes as the commercial manufacture of aviation gasoline by hydrofluoric acid alkylation is caused by the loss of hydrogen fluoride in certain gaseous effluent streams. It may be noted that the afore-mentioned Engs et al. Patent 2,282,712 does not suggest any application of the process to the recovery of hydrogen fluoride, undoubtedly because Engs et al. recognized that hydrogen fluoride is an exceptional hydrogen halide, the physical and chemical behavior of which is entirely unpredictable and out of line with hydrogen chloride, bromide and iodide. It is also possible that Engs et al. deliberately avoided specific mention of hydrogen fluoride because the high boiling point of this hydrogen halide makes stripping of it from the solvent exceedingly difficult or even obviously impossible, as in the case of the low-boiling ethers, dimethyl ether and ethyl methyl ether, which have boiling points much lower than that of hydrogen fluoride. A particular advantage of the use of glycols and hydroxy ethers of the present invention for recovering hydrogen fluoride from admixture with hydrocarbons and halogenated hydrocarbons is that the glycols and hydroxy ethers have an exceptionally small capacity for absorbing hydrocarbons and halogenated hydrocarbons, as compared with the solvents disclosed in Engs et al. 2,282,712 or the solvents disclosed and claimed in Frey application Serial No. 490,506 for the recovery of hydrogen fluoride.

This advantageously small capacity for absorbing hydrocarbons and the like is illustrated by the data for the first several oxycompounds in the following tabulation. The data represent experimental measurements of the volume of gaseous normal butane absorbed by 5 cc. of various liquid oxycompounds at room temperature (70 to 82° F.) and atmospheric pressure (approximately 760 mm.); they are arranged in the increasing order of the amount of butane absorbed. For ease of observing correlationships, the molecular weight and the boiling point of each oxycompound are also given.

| Oxycompound | Mol. Wt. | B. P., °F. | Butane Absorbed, cc. |
|---|---|---|---|
| Glycerine | 92.09 | 554 | 0.5 |
| Ethylene glycol | 62.07 | 387 | 4.2 |
| Diethylene glycol | 106.12 | 473 | 11.7 |
| Tetraethylene glycol | 194.23 | 610 | 16.1 |
| Diethylene glycol monoethyl ether | 134.17 | 395 | 41.1 |
| Ethylene glycol monoethyl ether | 90.12 | 275 | 57.0 |
| m-Cresol | 123.15 | 316 | 82.2 |
| Dichloroethyl ether | 143.02 | 352 | 97.4 |
| Allyl alcohol | 58.08 | 205 | 108.0 |
| Acetone | 58.08 | 132 | 116.5 |
| Diethylene glycol monobutyl ether | 162.23 | 448 | 121.7 |
| Cyclohexanol | 100.16 | 323 | 132.8 |
| Ethyl methyl ketone | 72.10 | 176 | 154.8 |
| 1,4-Dioxane | 88.10 | 215 | 161.9 |
| Ethyl alcohol | 46.07 | 173 | 168.3 |
| Methyl alcohol | 32.04 | 148 | 188.0 |
| n-Butyl alcohol | 74.12 | 244 | 205.1 |
| t-Butyl alcohol | 74.12 | 181 | 214.7 |
| Propyl alcohol | 60.09 | 207 | 218.9 |
| s-Butyl alcohol | 74.12 | 212 | 226.4 |
| Ethyl carbonate | 118.13 | 258 | 237.6 |
| Ethyl acetate | 88.10 | 171 | 240.2 |
| Ethyl formate | 74.08 | 130 | 249.0 |
| Amyl acetate | 130.18 | 300 | 301.2 |
| Ethylidene diethyl ether | 118.17 | 217 | 345.4 |
| n-Butyl ether | 130.23 | 288 | 403.5 |

It may be noted that, to mention only a few representative oxycompounds, dichloroethyl ether, dioxane, methyl alcohol, and normal butyl ether absorbed, respectively, 23.4, 38.6, 44.8, and 96.1 times as much normal butane as did ethylene glycol; it is clear that ethylene glycol advantageously has an extraordinarily relatively small capacity for absorbing organic compounds. Diethylene glycol is somewhat less advantageous in this respect, and other glycols and hydroxy ethers, such as tetraethylene glycol, diethylene glycol monoethyl ether, and ethylene glycol monoethyl ether are progressively still less so, in accordance with the constructional influences already indicated.

Another important characteristic that indicates the superiority of the selected oxycompounds of this invention is that they absorb the hydrogen halides more readily than do the oxycompounds heretofore proposed. For example, the following tabulation gives some comparable experimental values for the proportion of hydrogen chloride absorbed at equilibrium by ethylene glycol and by several other oxycompounds:

| Oxycompound | Temp., °F. | Pressure, mm. | HCl Absorbed, weight percent of Oxycompound |
|---|---|---|---|
| Ethylene glycol | 100 | 743 | 37.0 |
| Dioxane | 90 | 747 | 24.5 |
| Diisoamyl ether | 76 | 747 | 10.0 |
| Diphenyl ether | 93 | 747 | 0.63 |

It may be noted that, in spite of a relatively high temperature and a relatively low pressure, ethylene glycol absorbed much more hydrogen chloride than any of the other oxycompounds. In fact, it absorbed more than 50 per cent more than dioxane, heretofore generally regarded as the optimum oxycompound for absorbing this hydrogen halide. Similarly, ethylene glycol absorbs other hydrogen halides also relatively more efficiently, as is exemplified by the following tabulation of some experimental values for equilibrium absorption of hydrogen fluoride:

| Oxycompound | Temp., °F. | Pressure, mm. | HF Absorbed, weight percent of Oxycompound |
|---|---|---|---|
| Ethylene glycol | 84 | 742 | 350 |
| Diisoamyl ether | 76 | 742 | 50.5 |
| Diphenyl ether | 88 | 742 | 16.4 |
| Glycerine | 72 | 747 | 382 |

The 7-fold greater absorptive capacity of ethylene glycol for hydrogen fluoride as compared with that of diisoamyl ether, or its 21-fold greater capacity as compared with that of diphenyl ether, is quite unexpectedly and unpredictably high.

In the last tabulation are included some data for glycerine. It may be noted that glycerine absorbs hydrogen fluoride perhaps slightly more readily than does ethylene glycol, though not much so when allowance is made for the lower temperature and higher pressure used in the determination. However, in another respect, glycerine is not so advantageous as ethylene glycol, apparently because of a tendency to undergo undesirable reactions with the hydrogen fluoride. Thus, when the solutions were heated to 302–320° F. to expel the absorbed hydrogen fluoride, the recovery of hydrogen fluoride from the ethylene glycol was 96 per cent of that absorbed, whereas from the gylcerine it was only 78 per cent. Within the experimental error, no hydrogen fluoride was lost in using the ethylene glycol, whereas considerable was lost in using glycerine, presumably in formation of 1,3-dihydroxy-2-fluoro-propane. A similar reaction occurs with hydrogen chloride.

In the practice of this invention, the selected oxycompound, such as ethylene glycol, is used in the manner already familiar to the art from the descriptions in the aforementioned patents. Briefly, the selected oxycompound is used as a selective solvent for the hydrogen halide to be recovered. Ordinarily a countercurrent continuous scrubbing is preferred, with the original mixture containing the hydrogen halide being in gaseous or vaporous phase. The resulting rich solvent is passed to a stripper in which the absorbed hydrogen halide is stripped from the solvent by the application of heat or relatively reduced pressure, or both. The stripped solvent is cooled, if necessary, and is recycled to the scrubbing step. Various modifications and extensions of this procedure may be utilized, as will be obvious to those skilled in the art.

The amount of solvent fed to the absorber should be at least sufficient to dissolve substantially all of the hydrogen halide present in the feed gas undergoing scrubbing. Preferably a considerable excess of solvent over this amount should be employed in order to ensure complete removal of the hydrogen halide. The determination of the "oil rate" or amount of solvent per unit volume of gas being scrubbed will depend on many factors including the concentration of hydrogen halide in the feed gas, the pressure, temperature, efficiency of absorption, particular solvent selected, etc., but will be well within the skill of the art. Employment of a very great excess of solvent over that required to dissolve the hydrogen halide completely may be undesirable because of economic considerations.

The pressure maintained in the absorption step is such that the material being scrubbed is maintained in the gaseous phase. Ordinarily the pressure will range from atmospheric to moderately superatmospheric, say not over 100 pounds per square inch gage, thereby keeping compressor requirements at a minimum.

If desired, provision may be made for stripping any absorbed material other than hydrogen halide, e. g., organic compound such as hydrocarbon or halogenated hydrocarbon, from the rich absorption medium as it approaches the bottom of the absorption tower. For example, a small stream of the hydrogen halide-rich gas liberated in the stripper column may be injected into the bottom of the absorber. Alternatively, a limited amount of heat may be applied to the rich absorption liquid prior to its withdrawal from the bottom of the absorber; for example, a reboiler of conventional type in, or operating in conjunction with, the bottom of the absorber may be provided.

The temperature at which the absorption operation is conducted may vary over fairly wide limits, but should be such that the hydrogen halide-containing mixture is in the gaseous state during the scrubbing. In general the lower the temperature the greater the solubility of the hydrogen halide in the absorbing liquid. Temperatures of from 50 to 250° F. may be employed. These figures refer to the temperature at the top of the absorption tower. The temperature at the bottom may be the same as at the top or somewhat higher in the case where reboiling is used.

It is highly preferred to maintain the entire system anhydrous. This may be accomplished by taking appropriate measures to exclude water from the hydrogen halide-containing mixture to be treated in accordance with my invention and by using an anhydrous liquid oxycompound as the absorbing medium. By carrying out the absorption and the stripping operations in a closed system, the admission of water may be prevented. By using anhydrous conditions, I prevent the contamination of the residual gas and of the recovered hydrogen halide with water and greatly reduce corrosion of equipment or necessity of using expensive corrosion-resisting construction since, as is well known, aqueous hydrogen halides are very corrosive to ordinary materials of construction whereas the anhydrous hydrogen halides are not.

Following are illustrative examples of typical modes of carrying out the present invention.

*Example I*

An anhydrous mixture of hydrogen fluoride and one or more paraffins having four to five carbon atoms per molecule, such as may be segregated in a plant for the production of gasoline hydrocarbons by hydrofluoric acid alkylation, is countercurrently scrubbed in gaseous phase with liquid anhydrous ethylene glycol at a temperature of approximately 80 to 200° F. and correspondingly appropriate pressure. When a scrubbing temperature above this range is used, the solvent may be advantageously diethylene glycol, which has a much lower vapor pressure than that of ethylene glycol; similarly, tetraethylene glycol or triethylene glycol which have the advantageously high boiling points of approximately 610 and 545° F., respectively, may be used instead of ethylene glycol. The resulting hydrogen fluoride-rich solvent is passed to a stripping column, in which it is heated to a relatively higher temperature, suitably 250 to 300° F., to drive part or substantially all of the hydrogen fluoride out of solution. At much higher temperatures some provision for refluxing, to condense and return vaporized solvent, is desirable and may be readily provided by those skilled in the art. The expelled hydrogen fluoride is condensed and is passed to storage or is returned for use as a catalyst in the production of hydrocarbons by hydrofluoric acid alkylation. The stripped or hydrogen fluoride-depleted solvent is recycled to the scrubbing step for re-use in recovering hydrogen fluoride.

*Example II*

A gaseous mixture comprising chiefly ethane and hydrogen chloride is scrubbed countercurrently with anhydrous diethylene glycol monoethyl ether at room temperature and slightly above atmospheric pressure. The relative through-put of the solvent is adjusted in accordance with the content of hydrogen chloride in the original gaseous mixture, so that the effluent gas contains substantially no hydrogen chloride. The resulting rich solution is warmed to expel the hydrogen chloride, which is withdrawn to storage or to any desired use; the temperature in the stripping step is satisfactorily about 150 to 200° F., but it may be higher, depending on the pressure at which the hydrogen chloride is withdrawn.

*Example III*

A mixture consisting mostly of propane and hydrogen iodide is scrubbed in the gaseous phase at slightly elevated temperature and approximately atmospheric pressure with diethylene glycol in a countercurrent extraction tower. If desired, the effluent propane may be subsequently washed with water or with an alkaline solution to remove unabsorbed traces of hydrogen iodide, in order to ensure that it is acid-free and suitable for any particular use, such as catalytic dehydrogenation to propylene; for many purposes, however, the propane is sufficiently well freed from hydrogen iodide in the scrubbing step. The rich diethylene glycol is stripped by heating, and the expelled hydrogen iodide is withdrawn to storage. The depleted diethylene glycol is recycled to the scrubbing step.

It may be noted that separation of such mixtures as those of the foregoing examples is relatively exceedingly difficult to effect by distillation because of the closeness of the boiling points of the main components and because of a pronounced tendency to form low-boiling azeotropes.

While the invention has been described with particular reference to the separation of close-boiling mixtures of a hydrogen halide and one or more hydrocarbons, it is similarly applicable to close-boiling mixtures of a hydrogen halide and one or more halogenated hydrocarbons, such as for example a mixture of isobutyl fluoride and hydrogen fluoride. It is applicable to recovery of hydrogen halides from admixture with gases generally, from air or nitrogen, for example.

While in its broadest aspects the invention is applicable to the separation of hydrogen halide from admixture with any material provided only that the hydrogen halide-containing mixture is normally gaseous or is capable of assuming the gaseous state at moderately elevated temperatures, say not over 250° F. and usually not over 150° F., in practice it is applicable chiefly to the separation of hydrogen halide from hydrocarbons or halogenated hydrocarbons which form therewith mixtures difficult or impossible to resolve by ordinary means such as fractional distillation whether the difficulty of separation be attributable to the closeness of boiling points or to the formation of an azeotrope or pseudo-azeotrope or be due to the difficulty of condensing the hydrogen halide or the hydrocarbon or halogenated hydrocarbon in admixture therewith. For example, it is common to vent gaseous mixtures of light hydrocarbon gases and hydrogen halide from reaction systems. Thus it is often the practice to vent a gaseous mixture of ethane and hydrogen chloride from a paraffin isomerization system in order to prevent pyramiding of ethane to an objectionable extent. This represents a great loss of valuable hydrogen chloride. Similarly in HF alkylation plants it is customary to vent gaseous mixtures of HF and methane, ethane, propane or butane from the system. My invention provides a simple and economical method of recovering the hydrogen halide from such vent gases. HF forms a minimum-boiling azeotrope with such paraffins as propane, butane and pentane. My invention enables such an azeotrope to be resolved readily.

The hydrocarbon in admixture with the hydrogen halide may be a paraffin, especially the paraffins having from one to five carbon atoms per molecule. However, it may be an olefin or a diolefin, for example those olefins and diolefins having from two to five carbon atoms per molecule. Or it may be any other hydrocarbon forming with the hydrogen halide a normally gaseous mixture or a mixture capable of being converted to the gaseous state by heating to moderately elevated temperature, say not over 250° F. and usually not over 150° F.

As used herein and in the claims, the term "hydrogen halide" denotes hydrogen chloride, bromide, and iodide and even hydrogen fluoride which, because of its anomalous behavior in comparison to the regular behavior of the chloride, bromide and iodide, is often excluded either expressly or by implication from the scope of the term "hydrogen halide" as the term is used in the prior art.

I claim:

1. A process for the recovery of hydrogen halide from a mixture containing same together with an organic compound difficultly separable therefrom by ordinary means such as fractional distillation or condensation which comprises subjecting said mixture in the gaseous state to absorption in a liquid acyclic organic oxycompound having at least one solely oxygen-bounded series of at least two contiguous methylene groups, at least one of the two oxygens bounding the series being hydroxylic, and thereby effecting selective dissolution of the hydrogen halide in said liquid acyclic organic oxycompound while allowing said organic compound originally in admixture with the hydrogen halide to pass through relatively undissolved, withdrawing the hydrogen halide-rich liquid organic oxycompound and stripping the hydrogen halide therefrom in a separate zone.

2. The process of recovering hydrogen halide from a mixture containing same in admixture with an organic compound which comprises subjecting said mixture in the gaseous state to absorption in a liquid glycol having only terminal hydroxyl groups and thereby effecting selective dissolution of the hydrogen halide in said glycol while allowing said organic compound to pass through relatively undissolved, withdrawing the hydrogen halide-rich glycol and stripping the hydrogen halide therefrom in a separate zone.

3. The process of claim 8 wherein said absorption is conducted at a pressure ranging from atmospheric to 100 pounds per square inch gauge and a temperature of from 50 to 250° F.

4. The process of recovering hydrogen fluoride from a mixture containing same in admixture with a $C_3$ to $C_5$ paraffin which comprises subjecting said mixture in the gaseous state to absorption in ethylene glycol and thereby effecting selective dissolution of the hydrogen fluoride in said ethylene glycol while allowing said paraffin to pass through undissolved, withdrawing the hydrogen fluoride-rich ethylene glycol and stripping the hydrogen fluoride therefrom in a separate zone.

5. The process of recovering hydrogen fluoride from a mixture containing same in admixture with a $C_3$ to $C_5$ paraffin in azeotropic proportions which comprises subjecting said mixture in the gaseous state to absorption in ethylene glycol and thereby effecting selective dissolution of the hydrogen fluoride in said ethylene glycol while allowing said paraffin to pass through undissolved, withdrawing the hydrogen fluoride-rich ethylene glycol and stripping the hydrogen fluoride therefrom in a separate zone.

6. A method for the recovery of hydrogen halide from a mixture containing the same together with an organic compound which comprises subjecting said mixture in gas phase to absorption in a liquid acyclic organic oxycompound selected from the group consisting of glycols, glycols having a substituent radical substituted for one hydroxylic hydrogen, and glycols having a substituent radical substituted for a hydrogen on at least one methylene group wherein said substituent radical is selected from the group consisting of an alkanol and alkyl, and thereby effecting selective absorption of the hydrogen halide in said liquid organic oxycompound.

7. A process for the recovery of hydrogen halide from a mixture containing same together with a hydrocarbon which comprises subjecting said mixture in gas phase to absorption in a liquid acyclic organic oxycompound selected from the group consisting of glycols, glycols having a substituent radical substituted for one hydroxylic hydrogen, and glycols having a substituent radical substituted for a hydrogen on at least one methylene group wherein said substituent radical is selected from the group consisting of alkanol and alkyl, and thereby effecting selective absorption of the hydrogen halide in said liquid organic oxycompound while allowing said hydrocarbon to pass through relatively undissolved, withdrawing the hydrogen halide-rich liquid organic oxycompound, and stripping the hydrogen halide therefrom in a separate zone.

8. A process for recovering hydrogen halide from a mixture containing same in admixture with a compound difficultly separable therefrom by ordinary means selected from the group consisting of hydrocarbons and halogenated hydrocarbons, which comprises subjecting said mixture in gas phase to absorption in ethylene glycol and thereby effecting selective dissolution of the hydrogen halide in said ethylene glycol, withdrawing the hydrogen halide-rich ethylene glycol, and stripping the hydrogen halide therefrom in a separate zone.

9. A process for recovering hydrogen chloride from a mixture containing same in admixture with a compound difficultly separable therefrom by ordinary means selected from the group consisting of hydrocarbons and halogenated hydrocarbons, which comprises subjecting said mixture in gas phase to absorption in ethylene glycol and thereby effecting selective dissolution of the hydrogen chloride in said ethylene glycol, withdrawing the hydrogen chloride-rich ethylene glycol, and stripping the hydrogen chloride therefrom in a separate zone.

10. A process for recovering hydrogen fluoride from a mixture containing same in admixture with a compound difficultly separable therefrom by ordinary means selected from the group consisting of hydrocarbons and halogenated hydrocarbons, which comprises subjecting said mixture in gas phase to absorption in ethylene glycol and thereby effecting selective dissolution of the hydrogen fluoride in said ethylene glycol, withdrawing the hydrogen fluoride-rich ethylene glycol, and stripping the hydrogen fluoride therefrom in a separate zone.

11. A process for recovering hydrogen halide from a mixture containing same in admixture with a compound difficultly separable therefrom by ordinary means selected from the group consisting of hydrocarbons and halogenated hydrocarbons, which comprises subjecting said mixture in gas phase to absorption in a polyethylene glycol and thereby effecting selective dissolution of the hydrogen halide in said polyethylene glycol, withdrawing the hydrogen halide-rich polyethylene glycol, and stripping the hydrogen halide therefrom in a separate zone.

12. A process for recovering hydrogen halide from a mixture containing same in admixture with a compound difficultly separable therefrom by ordinary means selected from the group consisting of hydrocarbons and halogenated hydrocarbons, which comprises subjecting said mixture in gas phase to absorption in a diethylene glycol and thereby effecting selective dissolution of the hydrogen halide in said diethylene glycol, withdrawing the hydrogen halide-rich diethylene glycol, and stripping the hydrogen halide therefrom in a separate zone.

MARYAN P. MATUSZAK.

REFERENCES CITED

The following references are of record in the file of this patent:

UNITED STATES PATENTS

| Number | Name | Date |
| --- | --- | --- |
| 2,282,712 | Eng et al. | May 12, 1942 |